(12) United States Patent
You

(10) Patent No.: US 12,356,445 B2
(45) Date of Patent: Jul. 8, 2025

(54) METHOD FOR SENDING MEDIA ACCESS CONTROL CONTROL ELEMENT AND TERMINAL DEVICE

(71) Applicant: GUANGDONG OPPO MOBILE TELECOMMUNICATIONS CORP., LTD., Guangdong (CN)

(72) Inventor: Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 485 days.

(21) Appl. No.: 17/945,027

(22) Filed: Sep. 14, 2022

(65) Prior Publication Data

US 2023/0013617 A1    Jan. 19, 2023

Related U.S. Application Data

(63) Continuation of application No. PCT/CN2020/083374, filed on Apr. 3, 2020.

(51) Int. Cl.
   *H04W 74/00* (2009.01)
   *H04L 5/00* (2006.01)
   *H04W 74/0833* (2024.01)

(52) U.S. Cl.
   CPC ......... *H04W 74/004* (2013.01); *H04L 5/0035* (2013.01); *H04L 5/0051* (2013.01); *H04W 74/0833* (2013.01)

(58) Field of Classification Search
   None
   See application file for complete search history.

(56) References Cited

U.S. PATENT DOCUMENTS

| 11,342,980 B2* | 5/2022 | Chin | H04B 7/063 |
| 2021/0028848 A1* | 1/2021 | Tsai | H04W 76/19 |
| 2021/0050901 A1* | 2/2021 | Chin | H04W 72/56 |
| 2022/0209840 A1 | 6/2022 | You et al. | |
| 2023/0013617 A1* | 1/2023 | You | H04B 7/088 |

FOREIGN PATENT DOCUMENTS

| EP | 4018753 A1 | 6/2022 |
| WO | 2021/196236 A1 | 4/2020 |
| WO | 2020061955 A1 | 4/2020 |
| WO | 2021/098722 A1 | 5/2021 |

OTHER PUBLICATIONS

The EESR of corresponding European application No. 20928785.3, dated Dec. 6, 2022.

(Continued)

*Primary Examiner* — Faiyazkhan Ghafoerkhan
(74) *Attorney, Agent, or Firm* — Ladas & Parry, LLP

(57) ABSTRACT

Embodiments of the present application relate to a method for sending media access control control element and a terminal device, where the method includes: the terminal device sends a media access control (MAC) control element (CE) for reporting beam failure according to a size of an available uplink resource in a random access process. The embodiment of the present application can avoid transmission failure caused by an inappropriate size of the MAC CE for reporting beam failure.

12 Claims, 3 Drawing Sheets

400

The terminal device determines that a beam failure occurs, and triggers/generates the MAC CE for reporting the beam failure — S410

The terminal device receives a RAR in Msg2/MsgB, and truncates the MAC CE in the case that a UL grant carried by the RAR cannot satisfy transmission of the MAC CE; or, the terminal device truncates the MAC CE in the case that a preconfigured UL grant does not satisfy transmission of the MAC CE — S420

A terminal device sends a MAC CE for reporting beam failure according to a size of an available uplink resource in a random access process — S210

(56) References Cited

OTHER PUBLICATIONS

Oppo, "Open issues on SCell BFR", R2-2000658, 3GPP TSG-RAN WG2 Meeting#109 electronic, Feb. 24-Mar. 6, 2020, entire document.

The third Office Action of corresponding European application No. 20928785.3, dated May 3, 2024.

Spreadtrum Communications, "Discussion on multi-beam operation", R1-1912563, 3GPP TSG RAN WG1 #99, Reno, USA, Nov. 18-22, 2019.

The oral proceeding issued in the corresponding European patent application No. 20928785.3, dated Oct. 1, 2024.

The first Office Action of corresponding European application No. 20928785.3, dated Sep. 5, 2023.

International Search Report (ISR) dated Dec. 31, 2020 for Application No. PCT/CN2020/083374 and its English Translation provided by WIPO.

Written Opinion (WOSA) dated Dec. 31, 2020 for Application No. PCT/CN2020/083374, and its English Translation provided by Google Translate.

Samsung, "Summary of Beam Management Enhancements", R2-2001672, 3GPP TSG-RAN WG2 Meeting#109e, Athens, Greece, Mar. 24-6, 2020, all pages.

Samsung, "Remaining issues of SCell BFR", R2-2000226, 3GPP TSG-RAN WG2 Meeting#109, Athens, Greece, Feb. 24-28, 2020, all pages.

The Office Action of corresponding European application No. 20928785.3, dated Jan. 25, 2024.

The Brief communication of corresponding European patent application No. 20928785.3, dated Apr. 1, 2025.

The Decision to refuse of corresponding European patent application No. 20928785.3, dated Apr. 11, 2025.

Apple, "Enhancement of PCell BFR Operation", R2-1915935, 3GPP TSG-RAN WG2 Meeting #108, Reno, Nevada, US, Nov. 18-22, 2019.

* cited by examiner

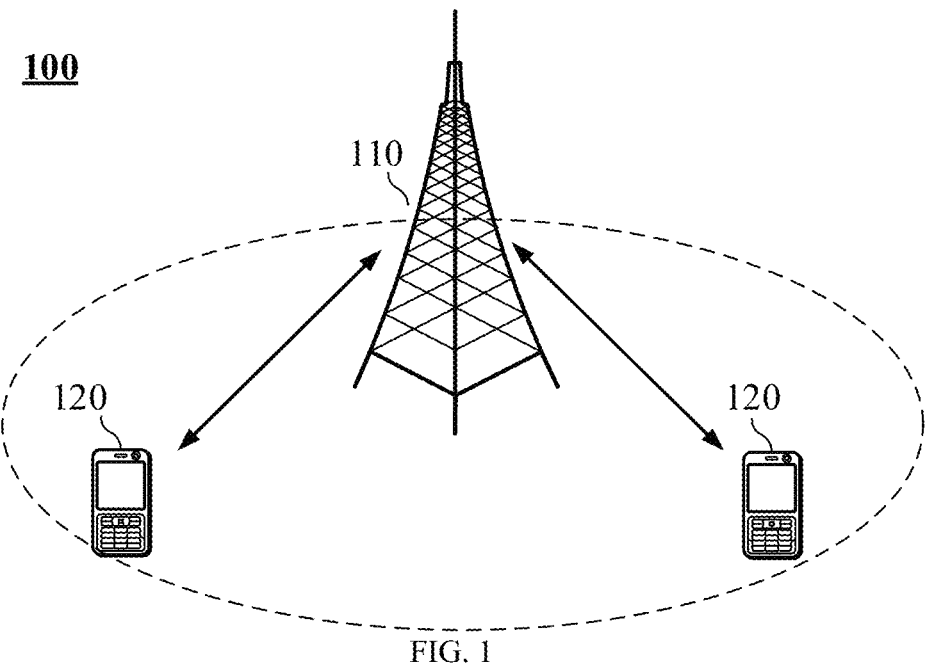

A terminal device sends a MAC CE for reporting beam failure according to a size of an available uplink resource in a random access process — S210

The terminal device receives a RAR in Msg2/MsgB, and triggers/generates the MAC CE based on a size of a UL grant carried by the RAR; or, the terminal device triggers/generates the MAC CE based on a size of a preconfigured UL grant — S310

A terminal device sends a MAC CE for reporting beam failure according to a size of an available uplink resource in a random access process — S210

FIG. 3

METHOD FOR SENDING MEDIA ACCESS CONTROL CONTROL ELEMENT AND TERMINAL DEVICE

CROSS-REFERENCE TO RELATED APPLICATIONS

This application is a continuation of International Application No. PCT/CN2020/083374, filed on Apr. 3, 2020, which is hereby incorporated by reference in its entirety.

TECHNICAL FIELD

The present application relates to the field of communication and, in particular to, a method for sending media access control control element and a terminal device.

BACKGROUND

A terminal device may perform beam failure detection (BFD) and beam failure recovery (BFR) procedures based on a network configuration. The beam failure detection means that the terminal device detects a beam failure on a synchronization signal block (SSB, SS/PBCH Block)/channel state information (CSI)-reference signal (RS) configured by the network. The beam failure recovery is used by the terminal device to indicate a new SSB/CSI-RS to a serving cell.

If the network side does not configure specific resources for the BFR, the UE can only perform the beam failure recovery by initiating contention-based random access. At present, R16 introduces a secondary cell (SCell) by reporting a BFR media access control (MAC) control element (CE, Control Element) to indicate that the SCell has a beam failure, and the MAC CE is transmitted through a third step message (Msg3) of random access. However, since a size of a Msg3 resource is configured in a random access response (RAR) through the network side, the MAC CE may not be transmitted due to an inappropriate size of the MAC CE.

SUMMARY

Embodiments of the present application provides a method for sending media access control control element and a terminal device, The transmission failure caused by an inappropriate size of the MAC CE used to report the beam failure can be avoided.

The embodiment of the present application provides a method for sending media access control control element, including:

sending, by a terminal device, a MAC CE for reporting beam failure according to a size of an available uplink resource in a random access process.

The embodiment of the present application provides a terminal device, including:

a sending module, configured to send a MAC CE for reporting beam failure according to a size of an available uplink resource in a random access process.

The embodiment of the present application provides a terminal device, including: a processor and a memory, where the memory is used to store a computer program, and the processor is used to call and run the computer program stored in the memory to perform the above method for sending MAC CE.

The embodiment of the present application provides a chip, including: a processor, used to call and run a computer program from a memory to enable a device installed with the chip to perform any one of the above method for sending MAC CE.

The embodiment of the present application provides a computer-readable storage medium, used to store a computer program that enables a computer to perform the above method for sending MAC CE.

The embodiment of the present application provides a computer program product, including computer program instructions that enable a computer to perform the above method for sending MAC CE.

The embodiment of the present application provides a computer program, where the computer program enables a computer to perform the above method for sending MAC CE.

According to the embodiment of the present application, the terminal device sends the MAC CE for reporting beam failure according to the size of the available uplink resource in the random access process, which can avoid the failure to transmit the MAC CE due to the inappropriate size of the MAC CE.

BRIEF DESCRIPTION OF DRAWINGS

FIG. 1 is a schematic diagram of an application scenario of an embodiment of the present application.

FIG. 2 is a flowchart for implementing a method 200 for sending MAC CE according to an embodiment of the present application.

FIG. 3 a flowchart for implementing a method 300 for sending MAC CE according to an embodiment of the present application.

DESCRIPTION OF EMBODIMENTS

Figure 4:
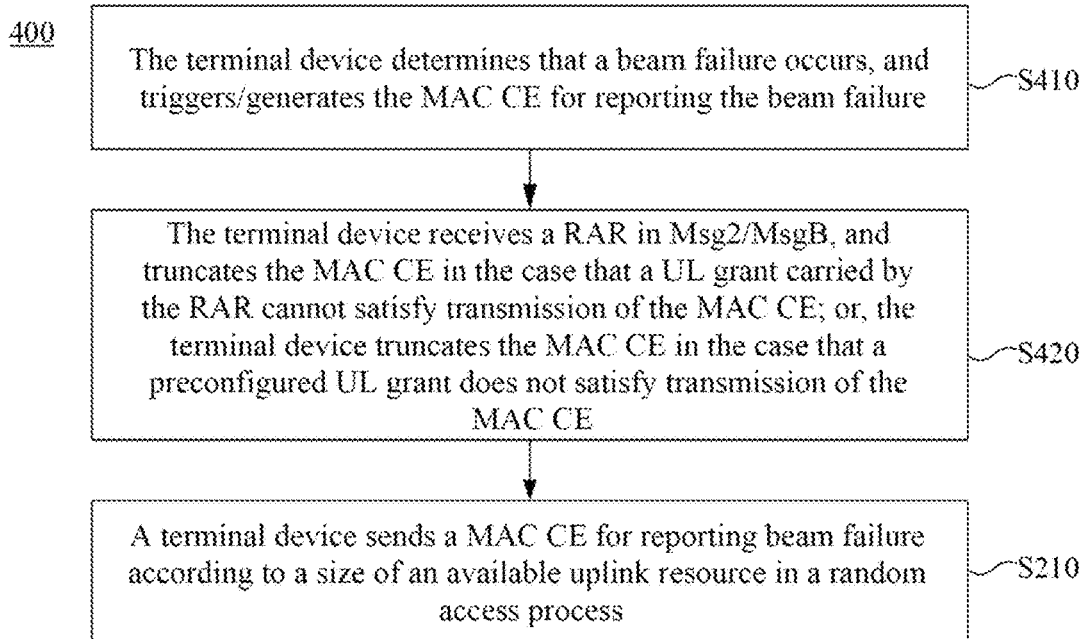
FIG. 4 is a flowchart for implementing a method 400 for sending MAC CE according to an embodiment of the present application.

The technical solutions in the embodiments of the present application will be described below with reference to the accompanying drawings in the embodiments of the present application.

It should be noted that the terms "first" and "second" in the embodiments of the description and the claims of the present application and the drawings are used to distinguish similar objects, and are not necessarily used to describe a specific order or sequence. The objects described by "first" and "second" at the same time may be the same or different.

The technical solutions of the embodiments of the present application can be applied to various communication systems, for example, a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of NR system, a LTE-based access to unlicensed spectrum (LTE-U) system, a NR-based access to unlicensed spectrum (NR-U) system, an universal mobile telecommunication system (UMTS), a wireless local area network (WLAN), a wireless fidelity (WiFi), a 5th-Generation (5G) system or other communication systems, etc.

Generally speaking, traditional communication system supports a limited number of connections and is easy to implement. However, with the development of communication technology, the mobile communication system will not only support traditional communication, but also support, for example, device to device (D2D) communication, machine to machine (M2M) communication, machine type communication (MTC), and vehicle to vehicle (V2V) communication, etc. The embodiments of the present application may also be applied to these communication systems.

In an implementation, the communication system in the embodiment of the present application may be applied to a carrier aggregation (CA) scenario, a dual connectivity (DC) scenario, or a standalone (SA) network deployment scenario.

The embodiment of the present application does not limit the applied spectrum. For example, the embodiment of the present application may be applied to a licensed spectrum, or may also be applied to a licensed-free spectrum.

The embodiments of the present application describe various embodiments in conjunction with a network device and a terminal device, where the terminal device may also be referred to as an user equipment (UE), an access terminal, a subscriber unit, a subscriber station, a mobile radio station, a mobile station, a remote station, a remote terminal, a mobile device, an user terminal, a terminal, a wireless communication device, an user agent or an user apparatus, etc. The terminal device may be a station (ST) in a WLAN, a cellular phone, a cordless phone, a session initiation protocol (SIP) phone, a wireless local loop (WLL) station, a personal digital assistant (PDA) device, a handheld device with wireless communication capabilities, a computing device or other processing devices connected to wireless modem, an in-vehicle device, a wearable device, and next-generation communication system, such as a terminal device in a NR network or a terminal device in a future evolved public land mobile network (PLMN) network, etc.

As an example and not a limitation, in the embodiment of the present application, the terminal device may also be a wearable device. The wearable device can also be called a wearable smart device, which is a general term for an intelligent design of daily wear and development of wearable devices using wearable technology, such as glasses, gloves, watches, clothing and shoes. The wearable device is a portable device that is worn directly on the body or integrated into the user's clothing or accessories. The wearable device is not only a hardware device, but also realizes powerful functions through software support, data interaction, and cloud interaction. In a broad sense, the wearable smart device includes full-featured, large-scale, complete or partial functions without relying on smart phones, such as smart watches or smart glasses, and only focuses on a certain type of application function, which needs to cooperate with other devices, such as smart phones, such as various types of smart bracelets, smart jewelry, etc.

The network device may be a device for communicating with a mobile device, and the network device may be an access point (AP) in a WLAN, a base transceiver station (BTS) in GSM or CDMA, or a NodeB (NB) in WCDMA, and may also be an evolutional Node B (eNB or eNodeB) in LTE, or a relay station or an access point, or an in-vehicle device, a wearable device, and a network device (gNB) in an NR network or a network device in a future evolved PLMN network, etc.

In the embodiment of the present application, a network device provides services for a cell, and a terminal device communicates with the network device through transmission resources (for example, frequency domain resources, or spectrum resources) used by the cell, and the cell may be a cell corresponding to a network device (eg, a base station), the cell may belong to a macro base station, or may belong to a base station corresponding to a small cell. The small cells here may include metro cells, micro cells, pico cells, femto cells, etc. These small cells have characteristics of small coverage and low transmit power, which suitable for providing high-speed data transmission services.

FIG. 1 exemplarily shows one network device 110 and two terminal devices 120. In an implementation, a wireless communication system 100 may include a plurality of network devices 110, and there may be other numbers of terminal devices 120 in a coverage of each network device 110, which is not limited in the embodiment of the present application. The embodiment of the present application may be applied to one terminal device 120 and one network device 110, and may also be applied to one terminal device 120 and another terminal device 120.

In an implementation, the wireless communication system 100 may further include other network entities such as a mobility management entity (MME), and an access and mobility management function (AMF), which is not limited in the embodiment of the present application.

It should be understood that the terms "system" and "network" are usually used interchangeably herein. The term "and/or" herein is only an association relationship to describe associated objects, indicating that there may be three kinds of relationships, for example, A and/or B, it means there are three situations, where A exists alone, A and B exist at the same time, and B exists alone. In addition, the character "/" herein generally indicates that related objects are an "or" relationship.

An embodiment of the present application proposes a method for sending MAC CE, and FIG. 2 is a flowchart for implementing a method for sending MAC CE according to an embodiment of the present application, including the following steps:

S210: a terminal device sends a MAC CE for reporting beam failure according to a size of an available uplink resource in a random access process.

In some embodiments, the available uplink resource in the above random access process include at least one of the following:

an uplink grant (UL grant) carried by a random access response (RAR) in a random access second step message (Msg2);
a UL grant carried by the RAR in a random access MsgB; where the RAR may refer to a fallback RAR; and
a preconfigured UL grant.

In an implementation, the above preconfigured UL grant represents a UL grant configured by the network for sending physical uplink shared channel (PUSCH) part in the MsgA.

In an implementation, the above random access process includes a contention based random access (CBRA) and/or a contention-free random access (CFRA).

The random access procedure may include four-step random access (4-step RACH) and two-step random access (2-step RACH). In the two-step random access, the preamble of the first step and the payload of the third step of the four-step random access may be sent through one message (i.e., MsgA).

In order to generate and send an appropriate MAC CE, the embodiment of the present application adopts at least one of the following two methods.

Method One the embodiment of the present application generates a MAC CE according to the size of the UL grant carried by a RAR when/after receiving the RAR; or generates a MAC CE according to the size of the UL grant after acquiring the preconfigured UL grant. In this way, it may be avoided that the generated MAC CE may not be transmitted due to an inappropriate size.

In some embodiments, as shown in FIG. 3, before the above step S210, it further includes:

S310: the terminal device receives a RAR in Msg2/MsgB, and triggers/generates the MAC CE based on a size of a UL grant carried by the RAR; or, the terminal device triggers/generates the MAC CE based on a size of a preconfigured UL grant.

In an implementation, the above RAR is in response to a random access Msg1, MsgA or preamble triggered by the beam failure recovery process and sent by the terminal device.

Method Two when/after a beam failure occurs in the serving cell, a MAC CE for reporting beam failure information is generated. After that, when/after the RAR is received, if necessary, the MAC CE is truncated according to the size of the UL grant carried by the RAR, so that the truncated MAC CE may be transmitted normally; or, when/after the preconfigured UL grant is acquired, if necessary, the MAC CE is truncated according to the size of the preconfigured UL grant, so that the truncated MAC CE may be transmitted normally.

In some embodiments, as shown in FIG. 4, before the above step S210, it further includes:

S410: the terminal device determines that a beam failure occurs, and triggers/generates the MAC CE for reporting the beam failure; and S420: the terminal device receives a RAR in Msg2/MsgB, and truncates the MAC CE in the case that a UL grant carried by the RAR cannot satisfy transmission of the MAC CE; or, the terminal device truncates the MAC CE in the case that a preconfigured UL grant does not satisfy transmission of the MAC CE.

If the UL grant carried by the RAR can satisfy the transmission of the MAC CE, or the preconfigured UL grant can satisfy the transmission of the MAC CE, the MAC CE does not need to be truncated, and the MAC CE may be transmitted directly. In an implementation, the MAC CE or the truncated MAC CE may be transmitted in Msg3 or MsgA of the random access process.

In some embodiments, the above MAC CE carries at least one of the following:
 beam failure recovery information of at least one specific cell (SPCell, Special Cell); and
 beam failure recovery information of at least one secondary cell (SCell).

The SPCell includes a primary cell (PCell) and a primary secondary cell (PSCell).

In an implementation, the above method further includes: the terminal device determines content carried by the MAC CE according to the current situation of the cell in which the beam failure occurs.

In some embodiments, the above beam failure recovery information of the at least one SPCell includes:
 identification information of the SPCell in which a beam failure occurs;
 indication information of the SPCell in which the beam failure occurs, where the indication information is used to indicate whether a beam that satisfies a condition exists on the SPCell in which the beam failure occurs; and
 information of a beam that satisfies the condition on the SPCell in which the beam failure occurs.

In some embodiments, the beam failure recovery information of the at least one SCell includes:
 identification information of the SCell in which a beam failure occurs;
 indication information of the SCell in which the beam failure occurs, where the indication information is used to indicate whether a beam that satisfies a condition exists on the SCell in which the beam failure occurs; and
 information of a beam that satisfies the condition on the SCell in which the beam failure occurs.

In some embodiments, the content allowed to be truncated in the above MAC CE includes at least one of the following:
 identification information of the SCell in which a beam failure occurs;
 indication information of the SPCell in which the beam failure occurs, where the indication information is used to indicate whether a beam that satisfies a condition exists on the SPCell in which the beam failure occurs;
 information of a beam that satisfies the condition on the SPCell in which the beam failure occurs;
 indication information of the SCell in which the beam failure occurs, where the indication information is used to indicate whether a beam that satisfies the condition exists on the SCell in which the beam failure occurs; and
 information of a beam that satisfies the condition on the SCell in which the beam failure occurs.

In an implementation, the above identification information includes a serving cell index and/or indication bit information that whether the beam failure occurs in the serving cell.

Specifically, the above identification information may be an explicit serving cell index (5 bits), or may be a bit (bit) in a bitmap. For example, when 1 bit corresponding to a serving cell is set to 1, it represents that the beam failure occurs in the serving cell; and when the 1 bit is set to 0, it represents that no beam failure occurs in the serving cell.

In an implementation, the above information of the beam includes CSI-RS/SSB index.

Specific embodiments are given below for detailed description.

Embodiment 1

In the embodiment, the UE triggers or generates a MAC CE for reporting beam failure when/after receiving a RAR. The UE may trigger/generate the MAC CE based on the size of the UL grant carried by the RAR.

The above RAR is in response to a random access Msg1, preamble or MsgA triggered by BFR and sent by the UE.

Specifically, for the four-step random access process, the UE sends a random access Msg1/preamble triggered by the BFR, and when/after receiving a RAR in a Msg3, triggers or generates a MAC CE reporting beam failure based on the size of the UL grant carried by the RAR.

For the two-step random access process, the UE sends the MsgA for the random access triggered by the BFR, and when/after receiving the RAR in the MsgB, triggers or generates a MAC CE reporting beam failure according to the size of the UL grant carried by the RAR. The RAR in the MsgB may refer to a fallback RAR. Alternatively, the UE acquires a preconfigured UL grant, and triggers or generates a MAC CE reporting beam failure according to the size of the preconfigured UL grant. The preconfigured UL grant may represent the UL grant configured by the network for sending the PUSCH part in the MsgA.

The above random access includes CBRA and/or CFRA.

The above MAC CE may carry beam failure recovery information of at least one SPCell; and the above MAC CE may also carry beam failure recovery information of at least one SCell.

The above beam failure recovery information includes at least one of the following:
  identification information of the SPCell in which the beam failure occurs, where the identification information may be an explicit serving cell index (5 bits) or a bit in a bitmap. For example, if the 1 bit corresponding to a serving cell is set to 1, it means that a beam failure occurs in the serving cell; and
  identification information of the SCell in which the beam failure occurs, where the identification information may be an explicit serving cell index (5 bits) or a bit in a bitmap. For example, if the 1 bit corresponding to a serving cell is set to 1, it means that a beam failure occurs in the serving cell.

The above MAC CE may also carry indication information to indicate whether there is a beam that satisfies the condition.

The above MAC CE may also carry information of a beam that satisfies the condition, such as CSI-RS/SSB index.

Embodiment 2

In the embodiment, the UE triggers or generates a MAC CE when/after a beam failure occurs, and the MAC CE may include at least one of the following:
  identification information of the SPCell in which the beam failure occurs, where the identification information may be an explicit serving cell index (5 bits) or a bit in the bitmap. For example, if the 1 bit corresponding to a serving cell is set to 1, it means that a beam failure occurs in the serving cell;
  identification information of the SCell in which the beam failure occurs, where the identification information may be an explicit serving cell index (5 bits) or a bit in the bitmap. For example, if the 1 bit corresponding to a serving cell is set to 1, it means that a beam failure occurs in the serving cell;
  indication information, used to indicate whether there is a beam that satisfies the condition; and
  information of a beam that satisfies the condition, such as CSI-RS/SSB index.

When the UE judges that the above MAC CE carried content, it may be based on the current situation of the cell in which the beam failure occurs, or only based on whether the MAC CE needs to be carried by the Msg3.

When/after receiving the RAR, the UE needs to judge again whether the UL grant carried by the RAR satisfies the transmission of the MAC CE or not;
  if possible, the UE transmits the MAC CE;
  if not, the UE truncates the above MAC CE, including truncating at least one of the following:
  identification information of the SCell in which the beam failure occurs, where the identification information may be an explicit serving cell index (5 bits) or a bit in the bitmap. For example, if the 1 bit corresponding to a serving cell is set to 1, it means that a beam failure occurs in the serving cell;
  indication information of the SPCell in which the beam failure occurs, which is used to indicate whether a beam that satisfies the condition exists on the SPCell;
  information of a beam that satisfies the condition on the SPCELL in which the beam failure occurs, such as CSI-RS/SSB index;
  indication information of the SCell in which the beam failure occurs, which is used to indicate whether a beam that satisfies the condition exists on the SCell; and
  information of a beam that satisfies the condition on the SCELL where the beam failure occurs, such as CSI-RS/SSB index.

Specifically, when/after a beam failure occurs, the UE triggers or generates a MAC CE for reporting the beam failure. For the four-step random access process, the UE sends a random access Msg1/preamble, and when/after receiving the RAR in Msg3, judges whether the UL grant can satisfy the transmission of the MAC CE according to the size of the UL grant carried by the RAR; if possible, the MAC CE is transmitted in Msg3; and if not, the MAC CE is truncated, and then the truncated MAC CE is transmitted in the Msg3.

For the two-step random access process, the UE sends a random access MsgA, and when/after receiving the RAR in the MsgB, judges whether the UL grant can satisfy the transmission of the MAC CE according to the size of the UL grant carried by the RAR; if possible, the MAC CE is sent; and if not, the MAC CE is truncated, and then the truncated MAC CE is sent. Where the RAR in the MsgB may refer to a fallback RAR. Or, the UE acquires a preconfigured UL grant, and judges whether the transmission of the MAC CE can be satisfied according to the size of the preconfigured UL grant; if possible, the MAC CE is sent; and if not, the MAC CE is truncated, and then the truncated MAC CE is transmitted in the MsgA. The preconfigured UL grant may represent the UL grant configured by the network for sending the PUSCH part in the MsgA.

It can be seen that using the embodiments of the present application, the UE may generate and send a BFR MAC CE based on the size of the resource configured by the RAR, or truncate the generated BFR MAC CE if necessary, so as to avoid the situation that the MAC CE cannot be transmitted due to the inappropriate size of the MAC CE.

Figure 5:
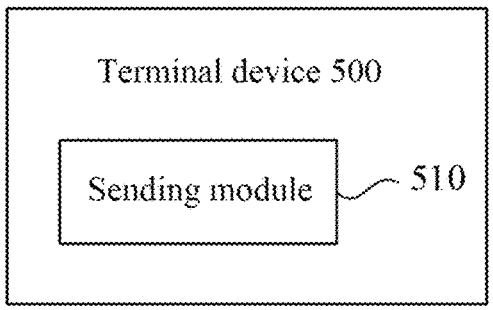
FIG. 5 is a schematic structural diagram of a terminal device 500 according to an embodiment of the present application.

The embodiment of the present application also proposes a terminal device. FIG. 5 is a schematic structural diagram of a terminal device 500 according to an embodiment of the present application, including:
  a sending module 510, configured to send a MAC CE for reporting a beam failure according to a size of an available uplink resource in a random access process.

In some embodiments, the available uplink resource in the random access process include at least one of the following:
  a UL grant carried by a RAR in a random access Msg2;
  a UL grant carried by the RAR in a random access MsgB; and a preconfigured UL grant.

In an implementation, the RAR in the MsgB may refer to a fallback RAR (fallback RAR).

In an implementation, the preconfigured UL grant represents a UL grant configured by the network for sending the PUSCH part in the MsgA.

Figure 6:
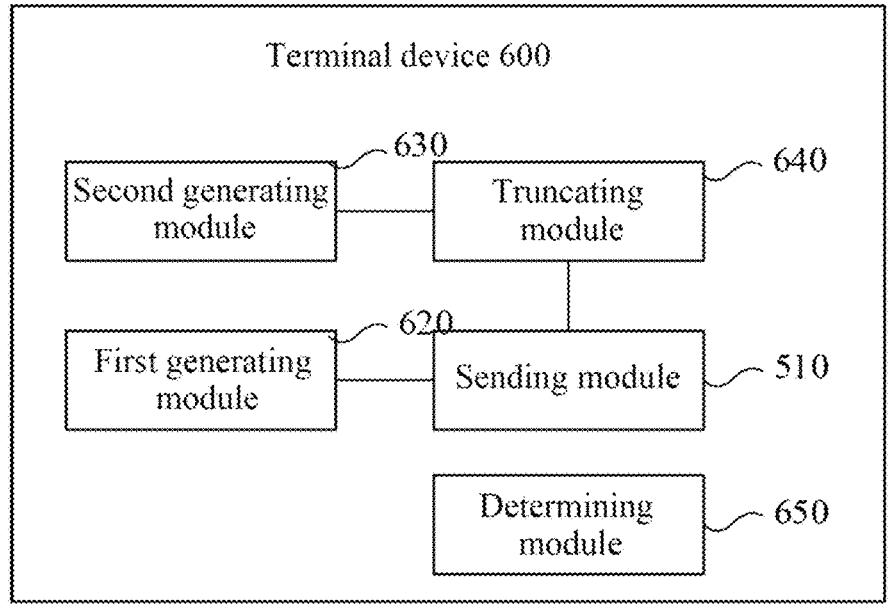
FIG. 6 is a schematic structural diagram of a terminal device 600 according to an embodiment of the present application.

In some embodiments, as shown in FIG. 6, the above terminal device further includes:

a first generating module 620, configured to receive a RAR in a Msg2/MsgB, and trigger/generate a MAC CE based on a size of the UL grant carried by the RAR; or, trigger/generate the MAC CE based on a size of the preconfigured UL grant.

In an implementation, the above RAR is in response to a random access Msg1, MsgA or preamble triggered by the beam failure recovery process and sent by the terminal device.

In some embodiments, as shown in FIG. 6, the above terminal device further includes:

a second generating module 630, configured to trigger/generate a MAC CE for reporting the beam failure when it is determined that the beam failure occurs; and a truncating module 640, for a RAR in a Msg2/MsgB, configured to truncate the MAC CE in the case that a UL grant carried by the RAR does satisfy transmission of the MAC CE; or, truncate the MAC CE in the case that a preconfigured UL grant does satisfy the transmission of the MAC CE.

In some embodiments, the above MAC CE carries at least one of the following:

beam failure recovery information of at least one specific cell (SPCell); and beam failure recovery information of at least one secondary cell (SCell).

In some embodiments, as shown in FIG. 6, the above terminal device further includes:

a determining module 650, configured to determine content carried by the MAC CE according to a current situation of a cell in which a beam failure occurs.

In an implementation, the beam failure recovery information of the above at least one SPCell includes:

identification information of the SPCell in which a beam failure occurs;

indication information of the SPCell in which the beam failure occurs, where the indication information is used to indicate whether a beam that satisfies the condition exists on the SPCell in which the beam failure occurs; and information of a beam that satisfies the condition on the SPCell in which the beam failure occurs.

In an implementation, the beam failure recovery information of the above at least one SCell includes:

identification information of the SCell in which a beam failure occurs;

indication information of the SCell in which the beam failure occurs, where the indication information is used to indicate whether a beam that satisfies a condition exists on the SCell in which the beam failure occurs; and information of a beam that satisfies the condition on the SCell in which the beam failure occurs.

In an implementation, the content allowed to be truncated in the above MAC CE includes at least one of the following:

identification information of the SCell in which a beam failure occurs;

indication information of the SPCell in which the beam failure occurs, where the indication information is used to indicate whether a beam that satisfies the condition exists on the SPCell in which the beam failure occurs;

information of a beam that satisfies the condition on the SPCell in which the beam failure occurs;

indication information of the SCell in which the beam failure occurs, where the indication information is used to indicate whether a beam that satisfies the condition exists on the SCell in which the beam failure occurs; and information of a beam that satisfies the condition on the SCell in which beam failure occurs.

In some embodiments, the above identification information includes a serving cell index and/or indication bit information that whether the beam failure occurs in the serving cell.

In an implementation, the above information of the beam includes a CSI-RS/SSB index.

In some embodiments, the above random access process includes contention random access and/or contention-free random access.

It should be understood that the above and other operations and/or functions of the modules in the terminal device according to the embodiments of the present application are for implementing the corresponding processes of the terminal device in the method 200 in FIG. 2, the method 300 in FIG. 3, and the method 400 in FIG. 4, respectively, which will not be repeated here for brevity.

Figure 7:
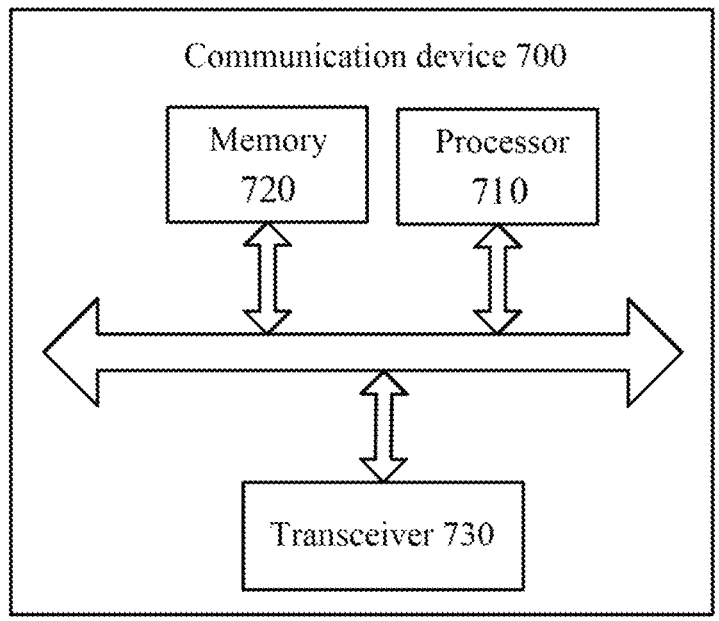
FIG. 7 is a schematic structural diagram of a communication device 700 according to an embodiment of the present application.

FIG. 7 is a schematic structural diagram of a communication device 700 according to an embodiment of the present application. The communication device 700 shown in FIG. 7 includes a processor 710, where the processor 710 may call and run a computer program from a memory, so as to implement the methods in the embodiments of the present application.

In an implementation, as shown in FIG. 7, the communication device 700 may further include a memory 720, where the processor 710 may call and run a computer program from the memory 720, so as to implement the methods in the embodiments of the present application.

The memory 720 may be a separate device independent of the processor 710, or may be integrated in the processor 710.

In an implementation, as shown in FIG. 7, the communication device 700 may further include a transceiver 730, and the processor 710 may control the transceiver 730 to communicate with other devices, specifically, may send information or data to other devices, or receive information or data sent by other devices.

The transceiver 730 may include a transmitter and a receiver. The transceiver 730 may further include antennas, and the number of the antennas may be one or more.

In an implementation, the communication device 700 may be a terminal device of the embodiment of the present application, and the terminal device 700 may implement the corresponding processes implemented by the first terminal device in each method of the embodiment of the present application, which will not be repeated here for brevity.

Figure 8:
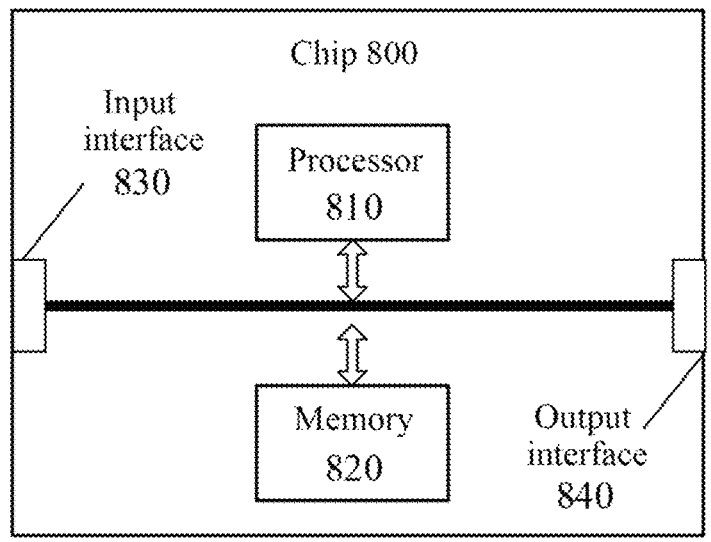
FIG. 8 is a schematic structural diagram of a chip 800 according to an embodiment of the present application.

FIG. 8 is a schematic structural diagram of a chip 800 according to an embodiment of the present application. The chip 800 shown in FIG. 8 includes a processor 810, where the processor 810 may call and run a computer program from a memory to implement the methods in the embodiments of the present application.

In an implementation, as shown in FIG. 8, the chip 800 may further include a memory 820, where the processor 810 may call and run a computer program from the memory 820 to implement the methods in the embodiments of the present application.

The memory 820 may be a separate device independent of the processor 810, or may be integrated in the processor 810.

In an implementation, the chip 800 may further include an input interface 830, where the processor 810 may control the input interface 830 to communicate with other devices or chips, and specifically, may acquire information or data sent by other devices or chips.

In an implementation, the chip 800 may further include an output interface 840, where the processor 810 may control the output interface 840 to communicate with other devices or chips, and specifically, may output information or data to other devices or chips.

In an implementation, the chip may be applied to the terminal device in the embodiment of the present application, and the chip may implement the corresponding processes implemented by the terminal device in each method of the embodiment of the present application, which will not be repeated here for brevity.

It should be understood that the chip mentioned in the embodiment of the present application may also be referred to as a system level chip, a system chip, a chip system, or a system-on-chip, or the like.

The processor mentioned above may be a general-purpose processor, a digital signal processor (DSP), a field programmable gate array (FPGA), an application specific integrated circuit (ASIC) or other programmable logic devices, transistor logic devices, discrete hardware components, etc. Where the general-purpose processor mentioned above may be a microprocessor or any conventional processor or the like.

The memory mentioned above may be either a volatile memory or a non-volatile memory, or may include both a volatile and a non-volatile memory. Where the non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM) or a flash memory. The volatile memory may be a random access memory (RAM).

It should be understood that the above-mentioned memory is an example but not a limitative description. For example, the memory in the embodiment of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM) and a direct memory bus random access memory (Direct Rambus RAM, DR RAM) and so on. That is, the memory in the embodiment of the present application is intended to include but not limited to these and any other suitable types of memories.

In the above embodiments, it may be implemented in whole or in part by software, hardware, firmware or any combination thereof. When implemented in software, it may be implemented in whole or in part in the form of a computer program product. The computer program product includes one or more computer instructions. When the computer program instructions are loaded and executed on a computer, all or part of the processes or the functions described in the embodiment of the present application are generated. The computer may be a general purpose computer, a special purpose computer, a computer network, or other programmable apparatuses. The computer instructions may be stored on a computer readable storage medium or transmitted from one computer readable storage medium to another computer readable storage medium, for example, the computer instructions may be transmitted from a web site site, a computer, a server or a data center to another website site, computer, server or data center over a wire (e.g., coaxial cable, optical fiber, digital subscriber line (DSL)) or wireless (e.g., infrared, microwave, etc.) means. The computer-readable storage medium may be any available medium that may be accessed by a computer or a server, a data center, and other data storage devices which integrate one or multiple available media. The available media may be magnetic media (e.g., floppy disk, hard disk, magnetic tape), optical media (e.g., DVD), or semiconductor media (e.g., solid state disk (SSD)), and so on.

It should be understood that, in various embodiments of the present application, the sequence numbers of the above-mentioned processes does not mean the sequence of execution, and the execution sequence of each process should be determined by its functions and internal logics, and should not constitutes any limitation on the implementation of the embodiments of the present application.

Those skilled in the art may clearly understand that, for the convenience and brevity of description, the specific working processes of the above systems, apparatuses and units may refer to the corresponding processes in the aforementioned method embodiments, which will not be not be repeated here.

The above are only specific implementations of the present application, but the scope of protection of the present application is not limited to this. Those changes or substitutions, which any person skilled in the art familiar with the technical filed may easily think of within the technical scope disclosed in the present application, should be covered within the scope of protection of the present application. Therefore, the scope of protection of the present application shall be subject to the scope of protection of the claims.

What is claimed is:

1. A terminal device, comprising:
   a processor, a memory and a transceiver, wherein the memory is used to store a computer program, and the processor is used to call and run the computer program stored in the memory to:
   determine that a beam failure occurs, and trigger/generate a media access control (MAC) control element (CE) for reporting the beam failure;
   send the MAC CE according to a size of an available uplink resource in a random access process;
   wherein the available uplink resource in the random access process comprises at least one of following:
   an uplink grant carried by a random access response (RAR) in a random access Msg2;
   an uplink grant carried by a RAR in a random access MsgB;
   a preconfigured uplink grant;
   wherein when sending the MAC CE according to the size of the available uplink resource in the random access process, the processor is further used to call and run the computer program to:
   for the RAR in the Msg2/MsgB, truncate the MAC CE in the case that the uplink grant carried by the RAR does not satisfy transmission of the MAC CE, and send the truncated MAC CE; or, truncate the MAC CE in the case that the preconfigured uplink grant does not satisfy transmission of the MAC CE, and send the truncated MAC CE.

2. The terminal device according to claim 1, wherein the MAC CE carries at least one of following:
   beam failure recovery information of at least one specific cell (SPCell); and
   beam failure recovery information of at least one secondary cell (SCell).

3. The terminal device according to claim 2, wherein the processor is further used to call and run the computer program to:
   determine content carried by the MAC CE according to a current situation of a cell in which a beam failure occurs.

4. The terminal device according to claim 3, wherein the beam failure recovery information of the at least one SPCell comprises:
   identification information of the SPCell in which a beam failure occurs;
   indication information of the SPCell in which the beam failure occurs, wherein the indication information is used to indicate whether a beam that satisfies a condition exists on the SPCell in which the beam failure occurs; and
   information of a beam that satisfies the condition on the SPCell in which the beam failure occurs.

5. The terminal device according to claim 2, wherein the beam failure recovery information of the at least one SPCell comprises:
   identification information of the SPCell in which a beam failure occurs;
   indication information of the SPCell in which the beam failure occurs, wherein the indication information is used to indicate whether a beam that satisfies a condition exists on the SPCell in which the beam failure occurs; and
   information of a beam that satisfies the condition on the SPCell in which the beam failure occurs.

6. The terminal device according to claim 5, wherein the identification information comprises a serving cell index and/or indication bit information that whether the beam failure occurs in a serving cell.

7. The terminal device according to claim 5, wherein the information of the beam comprises channel state information (CSI)-reference signal (RS)/synchronization signal block (SSB) index.

8. The terminal device according to claim 2, wherein the beam failure recovery information of the at least one SCell comprises:
   identification information of the SCell in which a beam failure occurs;
   indication information of the SCell in which the beam failure occurs, wherein the indication information is used to indicate whether a beam that satisfies a condition exists on the SCell in which the beam failure occurs; and
   information of a beam that satisfies the condition on the SCell in which the beam failure occurs.

9. The terminal device according to claim 2, wherein content allowed to be truncated in the MAC CE comprises at least one of the following:
   identification information of the SCell in which a beam failure occurs;
   indication information of the SPCell in which the beam failure occurs, wherein the indication information is used to indicate whether a beam that satisfies a condition exists on the SPCell in which the beam failure occurs;
   information of a beam that satisfies the condition on the SPCell in which the beam failure occurs;
   indication information of the SCell in which the beam failure occurs, wherein the indication information is used to indicate whether a beam that satisfies the condition exists on the SCell in which the beam failure occurs; and
   information of a beam that satisfies the condition on the SCell in which the beam failure occurs.

10. The terminal device according to claim 1, wherein the random access process comprises contention random access and/or contention-free random access.

11. A chip, comprising: a processor, used to call and run a computer program from a memory to enable a device installed with the chip to:
    determine that a beam failure occurs, and trigger/generate a media access control (MAC) control element (CE) for reporting the beam failure;
    send the MAC CE according to a size of an available uplink resource in a random access process;
    wherein the available uplink resource in the random access process comprises at least one of following:
    an uplink grant carried by a random access response (RAR) in a random access Msg2;
    an uplink grant carried by a RAR in a random access MsgB;
    a preconfigured uplink grant;
    wherein when sending the MAC CE according to the size of the available uplink resource in the random access process, the device is further enabled to:
    for the RAR in the Msg2/MsgB, truncate the MAC CE in the case that the uplink grant carried by the RAR does not satisfy transmission of the MAC CE, and send the truncated MAC CE; or, truncate the MAC CE in the case that the preconfigured uplink grant does not satisfy transmission of the MAC CE, and send the truncated MAC CE.

12. A non-transitory computer-readable storage medium, used to store a computer program that enables a computer to:
    determine that a beam failure occurs, and trigger/generate a media access control (MAC) control element (CE) for reporting the beam failure;
    send the MAC CE according to a size of an available uplink resource in a random access process;
    wherein the available uplink resource in the random access process comprises at least one of following:
    an uplink grant carried by a random access response (RAR) in a random access Msg2;
    an uplink grant carried by a RAR in a random access MsgB;
    a preconfigured uplink grant;
    wherein when sending the MAC CE according to the size of the available uplink resource in the random access process, the computer is further enabled to:
    for the RAR in the Msg2/MsgB, truncate the MAC CE in the case that the uplink grant carried by the RAR does not satisfy transmission of the MAC CE, and send the truncated MAC CE; or, truncate the MAC CE in the case that the preconfigured uplink grant does not satisfy transmission of the MAC CE, and send the truncated MAC CE.

* * * * *